Aug. 16, 1949.                H. KONET                 2,479,122
                            RATE GYROSCOPE
                        Filed Jan. 30, 1946
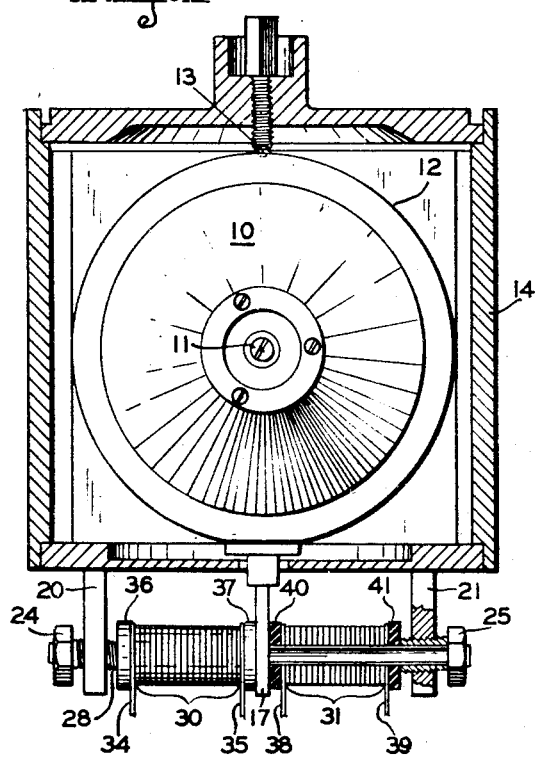
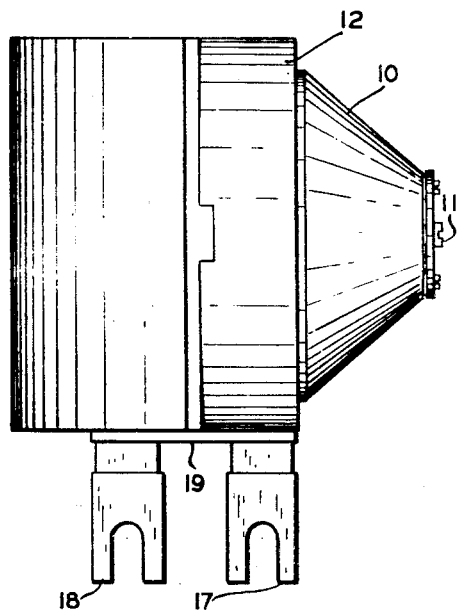
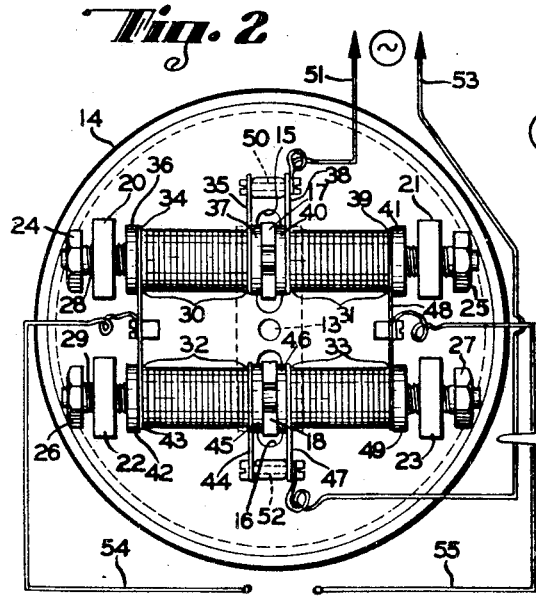
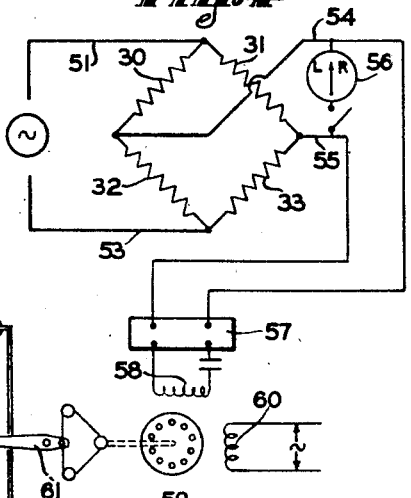
INVENTOR
HENRY KONET
BY
ATTORNEY Patented Aug. 16, 1949

2,479,122

UNITED STATES PATENT OFFICE 2,479,122

RATE GYROSCOPE

Henry Konet, Paramus, N. J., assignor to Bendix Aviation Corporation, Teterboro, N. J., a corporation of Delaware Application January 30, 1946, Serial No. 644,379

5 Claims. (Cl. 74—5.6)

This invention relates to rate sensitive devices for aircraft or the like and more particularly to a novel rate of turn gyro for indicating the rate of turn and/or generating a signal truly proportional to the rate function developed by the craft or other vehicle or missile carrying the gyro during a displacement about any one of its axes.

Rate sensitive devices of this character generally comprise a gyro rotor mounted for spinning about one axis such as, for example, the craft's transverse axis, if the device is to respond to turn in azimuth, and for precession about a second axis perpendicular to the spin axis which, in the example being considered, would be the craft's longitudinal axis. A resilient constraint, usually in the nature of coil springs, cantilever springs, eddy-current damping devices, etc., is provided at the precession axis to restrain gyro precession about the latter axis to an angle bearing a definite relation to the rate of turn of the craft. Where, in addition to an indication of the rate of turn, or in place thereof, it is desired to generate a signal proportional to the rate of turn for control purposes, and electrical pick-off mechanism, generally in the nature of a variable transformer is provided, one part of the pick-off being stationary and the other movable with the gyro rotor about the axis of precession.

While suitable for most uses, rate sensitive devices of the known character have certain limitations making them undesirable for application where rapid and extremely accurate responses are required. These limitations arise, first of all, because of the provision of the spring restraint which necessarily subjects the gyro rotor to undesirable oscillations, the natural frequency of which is low. Moreover, the presence of such springs develops the so-called cosine effect which injects another undesirable error into the gyro response by making it non-linear in character and requires the provision of special scales in order to compensate for such non-linear responses. Further, provisions in the nature of dashpots have been relied upon to dampen gyro rotor oscillations due to the springs and though effective to some extent another limitation was injected thereby, i. e., making the gyro sluggish in its response to small turns.

By the present invention, a novel rate of turn gyro is provided whereby the restraining springs and dashpots are eliminated thereby permitting thte elimination of previously required bearings, hairsprings, etc., and thus overcoming all of the above limitations heretofore encountered with conventional devices of this character.

An object of the present invention, therefore, is to provide a novel rate sensitive device adapted for indicating the rate of turn and/or generating a signal truly proportional to the rate of turn for control purposes.

Another object of the invention is to provide a novel rate of turn gyro having a high natural frequency period thereby making it independent of the frequencies being measured.

A further object is to provide a novel rate of turn gyro wherein all the limitations heretofore encountered with the use of similar gyros of the prior art have been overcome.

Another object is to provide a novel rate of turn gyro wherein conventional restraining springs have been replaced with a novel and substantially rigid mechanism which, during a turn, limits the angular displacement of the gyro rotor about its axis of precession to such a degree that the gyro remains substantially without motion and a system is thereby provided having a high natural frequency making it independent of the wide range of frequencies being encountered.

A further object is to provide a novel rate of turn gyro or rate signal generator in which the full precession force of the rotor developed during a turn is applied directly to a force sensitive device whereupon a signal proportional to the precession force or torque is developed by the latter device.

Another and further object of the present invention is to provide a novel rate of turn gyro wherein a substantially rigid precession opposing member is provided which limits gyro precession or displacement to a negligible amount and associated with the rigid member is an electric circuit so that upon the application of the precession torque to the rigid member a signal is developed in the circuit truly proportional to the rate of turn.

A further object is to provide a novel precession restraining member for a rate of turn gyro in the nature of one or more electrical resistor or impedance elements whose resistance or impedance to current flow changes with changes in the force applied thereon and arranged in a normally balanced electrical circuit to receive the full gyro precession torque to unbalance the circuit and develop therein a signal truly proportional to the rate of turn.

The above and other objects and advantages of the invention will appear more fully hereinafter from a consideration of the detailed description which follows, taken together with the accompanying drawing wherein one embodiment of the invention is illustrated. It is to be expressly understood, however, that the drawing is for the purpose of illustration and description only and not designed as a definition of the limits of the invention.

In the drawings, wherein like reference characters refer to like parts in the several views, Figure 1 is a top elevation view, with the top cover removed, of the novel rate sensitive device of the present invention;

Figure 2 is a front end elevation view of the novel device of Figure 1 with the novel precession restraining means thereof;

Figure 3 is a detail view of the device of Figure 1; and

Figure 4 is a wiring diagram of the pick-off circuit utilized with the device of Figure 1.

As is well known to those skilled in the art of rate sensitive gyroscopes, the precession torque of such gyroscopes is given as $T = I\Omega\omega$ where, $I$ = mass of inertia of the gyro rotor,
$\Omega$ = speed of turning about the chosen displacement axis, and,
$\omega$ = speed of gyro rotor rotation.

It is also well known, that the angle of gyro displacement during a turn about a chosen axis due to the precession torque is $D = KT$, where, $K$ = spring constant, and,
$T$ = gyro precession torque.

By the proper selection of the spring characteristic or constant $K$ the angle of displacement $D$ may be readily predetermined. Obviously, the more resilient the spring the greater the oscillation of the system will become and its natural frequency period will be lower while the provision of a substantially rigid precession opposing spring will substantially eliminate the oscillations of the system and increase the natural frequency period to a value making it independent of the wide range of frequencies likely to be encountered for measuring and/or control purposes.

The principle underlying the present invention, therefore, is to so restrain the precession of a rate of turn gyro that its angular displacement during a turn will be substantially zero, such result being achieved by the use of a substantially rigid member for restraining or opposing gyro precession.

Referring now to the drawings for a more detailed description of the novel rate of turn device of the present invention, it is shown in Figure 3 as comprising a rotor 10 mounted for spinning about an axis 11, the rotor being either electrically or pneumatically driven as is well known in the art. Rotor 10, further is provided with a rotor casing 12 which is pivotally supported, as shown in Figure 1, by way of studs 13 within an instrument housing 14 for oscillation about an axis perpendicular to the rotor spin axis.

As shown in Figure 1, by way of example only, the rotor spin axis 11 is shown as being normally vertical whereby the device so arranged would be sensitive to the rate of displacement in climb or descent of the craft or missile carrying the device. If, on the other hand, it were desired to measure the rate of displacement in azimuth, the gyro rotor will be mounted with its spin axis normally horizontal and parallel to the craft's transverse axis and for oscillation about a second horizontal axis perpendicular to the spin axis.

Novel precession opposing means are now provided in the form of a substantially rigid or non-elastic member whereby, during a turn, the gyro motor is maintained substantially without motion about its axis of oscillation and to this end the front end of housing 14 is provided with a pair of spaced and aligned slots 15 and 16, as shown in Figure 2, arranged above and below the pivotal point 13 of the rotor casing for accommodating the extended ends of a pair of bifurcated arms 17 and 18 which are attached at their inner ends to rotor casing 12 by way of a plate support 19.

Secured to the front of housing 14 are pairs of spaced brackets 20, 21 and 22, 23, each being threaded to receive therein hollow threaded bolts 24, 25, 26 and 27. Each pair of bolts 24, 25 and 26, 27 support therein rods 28 and 29 formed of glass or other suitable insulating material, the rods being spaced and parallel with each other and engaged at their centers by arms 17 and 18, at their bifurcations, carried by the rotor casing. Arranged on each rod 28 and 29 are carbon piles or stacks 30, 31 and 32, 33, each pile or stack being formed of a series of carbon discs slipped on to the rod. Pile 30, for example, is engaged at each of its ends by contact discs 34 and 35, disc 34 being engaged by a suitable insulating disc 36 which is interposed between contact 34 and the free end of bolt 24 while contact disc 35 is engaged by an insulating disc 37 interposed between the latter contact disc and one side of arm 17, while pile or stack 31 is engaged at each of its ends by contact discs 38 and 39, an insulating disc 40 being interposed between the opposite side of arm 17 and contact disc 38 and a second insulating disc 41 being interposed between contact disc 39 and the free end of bolt 25. By adjusting either bolt 24 or 25 or both the desired compression may be impressed upon the carbon piles or stacks 30 and 31.

Carbon piles or stacks 32 and 33 are arranged on rod 29 in generally the same manner as are piles or stacks 30 and 31, i. e., an insulating disc 42 engages the free end of bolt 26 and a contact disc 43 which, in turn, engages one end of pile 32, the opposite end of which is provided with a contact disc 44 engaging an insulating disc 45 resting against one side of arm 18, the opposite end of the arm being engaged by an insulating disc 46 which, in turn, engages one side of a contact disc 47 which is in contact with one side of pile 33, the opposite end of which engages a contact disc 48 resting against an insulating disc 49 which, in turn, rests against the free end of bolt 27. Adjustment of bolts 26 and 27 performs the same function as the operation of bolts 24 and 25.

As is known in the art, each of the carbon piles 30, 31, 32 and 33 constitutes a force sensing device in that each pile constitutes a resistor or impedance element whose resistance or impedance to current flow varies with the amount of force or torque impressed thereon. For this reason, the piles are arranged in a Wheatstone bridge circuit as shown in Figure 4. To this end, contact discs 35, 38 are electrically connected with each other through a conductor 50 and a lead 51 to one side of a suitable source (not shown) and contact discs 44, 47 are electrically connected with each other through a conductor 52 and a lead 53 to the opposite side of the source. The output of the circuit is constituted by leads 54, 55 which connect with contact discs 34, 43 and 39, 48, respectively.

Initially, bolts 24, 25, 26 and 27 are manipulated so that with arms 17 and 18 on dead center of rods 28 and 29, i. e., with the rotor spin axis 11 normally vertical as shown in the example of Figure 1, the resistance values of the piles 30, 31, 32 and 33 are made equal and the bridge circuit is balanced so that no current flows at leads 54, 55. Assuming a displacement about the axis of oscillation, a precessing torque is developed on the part of the rotor tending to displace the rotor and its casing angularly about the axis of oscillation. The fact that arms 17, 18 are in intimate contact through insulating discs 37, 40 and 45, 46 with piles 30, 31 and 32, 33 prevents the rotor and its casing from angular motion about the axis of studs 13. However, the full force of precession of the rotor is applied on piles 30 and 33 or piles 31 and 32, depending upon the direction of gyro displacement, so that their resistance to current flow is changed whereby the circuit is unbalanced and current flows at output leads 54 and 55, this current being truly proportional to the rate of turn developed during the displacement being considered.

This current may be measured by a suitable electrical instrument 56 connected to leads 54 and 55, as shown in Figure 4, the instrument being properly calibrated to give an indication of left or right turn. On the other hand, in addition to or in place of measuring the current developed due to the application of the full precession torque to the related carbon piles, the current appearing across leads 54, 55 may be fed into the input of a conventional vacuum tube amplifier 57, the output of which energizes the variable phase 58 of a two phase induction motor 59, the second phase 60 of which may be constantly energized from a suitable source of current (not shown). The rotor of motor 59 may be mechanically coupled with a control surface 61 so that the latter will be actuated in accordance with the rate signal developed by the novel rate generator hereof.

By providing a substantially rigid or non-elastic coupling, the oscillations previously occurring in rate of turn gyroscopes due to the use of resilient restraining springs have been eliminated and the natural frequency period of the system has been made high making it independent of the frequencies to be measured. Moreover, by the use of the novel precession opposing expedient, a rate of turn gyro is provided which is much smaller and simpler than heretofore in that bearings, dash-pots, centralizing springs, hairsprings, etc., have been eliminated.

Although but a single embodiment of the present invention has been illustrated and described in detail, it is to be expressly understood that the invention is not limited thereto. Various changes can be made in the design and arrangement of parts without departing from the spirit and scope of the invention as will now be understood by those skilled in the art. For example, carbon discs have been specified as constituting the piles or resistors hereof for receiving the full precession force of the rotor, however, other suitable material may be used for this purpose in place of carbon discs. For a definition of the limits of the invention, reference will be had primarily to the appended claims.

I claim:

1. In combination, a gyro rotor mounted for spinning about a predetermined axis, a frame supporting said rotor for oscillation about a second axis resulting from a precession torque developed by said rotor in response to an angular displacement of said rotor about said second axis, a housing pivotally mounting said frame therein, means comprising a normally balanced bridge circuit including in two arms thereof spaced resistor elements whose resistances to current flow change with the amount of force exerted thereon, a rod for supporting said resistor elements thereon arranged transversely of said second axis, means securing said rod to said housing, and means connected with said frame slidably engaging said rod intermediate said resistor elements for applying to one or the other of said elements the precession torque developed by said rotor whereby said bridge circuit is unbalanced.

2. A rate signal generator comprising a gyro rotor mounted for spinning about a predetermined axis, a frame supporting said rotor for oscillation about a second axis resulting from a precession torque developed by said rotor in response to an angular displacement of said rotor about said second axis, a housing pivotally supporting said frame therein, means comprising a normally balanced bridge circuit including in all four arms thereof resistor elements whose resistances to current flow change with the amount of force exerted thereon, a supporting member arranged transversely of and above said second axis for supporting two of said resistor elements thereon in spaced relation to each other, a second supporting member spaced from said first member and arranged transversely of and below said second axis for supporting the remaining two of said resistor elements thereon in spaced relation to each other, and means connected with said frame and slidably engaging both of said supporting members intermediate both pairs of said resistor elements for applying to two of the resistor elements located above and below said second axis the precession torque developed by said rotor whereby said bridge circuit is unbalanced.

3. In combination, a gyro rotor mounted for spinning about a predetermined axis, a frame supporting said rotor for oscillation about a second axis resulting from a precession torque developed by said rotor in response to an angular displacement of said rotor about said second axis, a housing pivotally supporting said frame therein, means comprising a normally balanced bridge circuit including in two arms thereof spaced hollow carbon pile resistors whose resistance to current flow changes with the amount of force exerted thereon, means mounting said resistors thereon transversely of said second axis and fastened to said housing, and means connected with said frame slidably engaging said mounting means intermediate said resistors for applying to one or the other of said resistors the precession torque developed by said rotor whereby said bridge circuit is unbalanced.

4. In combination, a gyro rotor mounted for spinning about a predetermined axis, a frame supporting said rotor for oscillation about a second axis resulting from a precession torque developed by said rotor in response to an angular displacement of said rotor about said second axis, a housing pivotally mounting said frame therein, means comprising a normally balanced bridge circuit including in two arms thereof spaced hollow resistor elements whose resistances to current flow change with the amount of force exerted thereon, a rod passing through said resistor elements and arranged transversely of said second axis, means mounting said rod on said housing, and means connected with said frame slidably engaging said rod intermediate said resistor elements for applying to one or the other of said elements the precession torque developed by said rotor whereby said bridge circuit is unbalanced.

5. A rate of turn gyro comprising a rotor mounted for spinning about a predetermined axis and for precession about a second axis perpendicular to said spin axis, means comprising a pair of spaced and axially aligned stacked hollow resistor elements for constraining precession of said rotor, means mounting said elements transversely of said second axis, and means slidably engaging said mounting means intermediate said stacked resistor elements and movable with said rotor about said second axis for impressing the precession force of said gyro on said resistor elements.

HENRY KONET.

REFERENCES CITED

The following references are of record in the file of this patent:

UNITED STATES PATENTS

| Number | Name | Date |
|---|---|---|
| 2,053,183 | Crane et al. | Sept. 1, 1936 |
| 2,137,974 | Fischel | Nov. 22, 1938 |